United States Patent
Limatibul

(10) Patent No.: US 11,110,687 B2
(45) Date of Patent: Sep. 7, 2021

(54) ALUMINIUM BARRIER LAMINATE AND BARRIER LINER AT SHOULDER FOR CONTAINER

(71) Applicant: KIMPAI LAMITUBE CO., LTD., Bangkok (TH)

(72) Inventor: Sumet Limatibul, Bangkok (TH)

(73) Assignee: KIMPAI LAMITUBE CO., LTD., Bangkok (TH)

(*) Notice: Subject to any disclaimer, the term of this patent is extended or adjusted under 35 U.S.C. 154(b) by 100 days.

(21) Appl. No.: 15/571,215

(22) PCT Filed: Dec. 22, 2016

(86) PCT No.: PCT/TH2016/000103
§ 371 (c)(1),
(2) Date: Nov. 1, 2017

(87) PCT Pub. No.: WO2017/151071
PCT Pub. Date: Sep. 8, 2017

(65) Prior Publication Data
US 2018/0345628 A1    Dec. 6, 2018

(30) Foreign Application Priority Data
Mar. 1, 2016    (TH) ................. 1601001164

(51) Int. Cl.
*B32B 15/085*    (2006.01)
*B32B 1/08*    (2006.01)
(Continued)

(52) U.S. Cl.
CPC .......... *B32B 15/085* (2013.01); *B29C 43/003* (2013.01); *B29C 43/18* (2013.01);
(Continued)

(58) Field of Classification Search
CPC . B29C 2043/189; B29C 43/003; B29C 43/18; B29D 22/003; B29K 2023/065;
(Continued)

(56) References Cited

U.S. PATENT DOCUMENTS

| 4,539,259 A | 9/1985 | Zuscik |
| 4,943,780 A | 7/1990 | Redding |

(Continued)

FOREIGN PATENT DOCUMENTS

| EP | 0 203 265 B1 | 8/1989 |
| EP | 0 351 925 B1 | 10/1993 |

(Continued)

OTHER PUBLICATIONS

International Search Report (ISR) and Written Opinion (WO) dated Jun. 2017 for International Application No. PCT/TH2016/000103.

(Continued)

*Primary Examiner* — Yan Lan
(74) *Attorney, Agent, or Firm* — Ladas & Parry LLP

(57) ABSTRACT

A laminate sheet, particularly an aluminium-based laminate comprises polyethylene having a density of 0.90-0.96 g/cc, a polyethylene-based film having a melting temperature of less than 240° C.; low density polyethylene in order to provide high adhesion; an aluminium barrier film, and a polyethylene-based film having a sealing property. Furthermore, the laminate sheet may further comprise a blown film or a dry laminate for making a tube and a tube shoulder in order to prevent flavor loss of the products packaged therein and without stress crack.

13 Claims, 4 Drawing Sheets

(51) Int. Cl.
| | |
|---|---|
| B32B 27/32 | (2006.01) |
| B32B 15/20 | (2006.01) |
| B32B 27/08 | (2006.01) |
| B29C 43/18 | (2006.01) |
| B29D 22/00 | (2006.01) |
| B29C 43/00 | (2006.01) |
| B65D 35/10 | (2006.01) |
| B65D 35/14 | (2006.01) |
| B65D 65/40 | (2006.01) |
| B32B 15/082 | (2006.01) |
| B32B 27/06 | (2006.01) |
| B32B 7/12 | (2006.01) |
| B32B 27/30 | (2006.01) |
| B32B 27/34 | (2006.01) |
| B32B 15/08 | (2006.01) |
| B29K 23/00 | (2006.01) |
| B29K 423/00 | (2006.01) |
| B29K 455/00 | (2006.01) |
| B29K 623/00 | (2006.01) |
| B29K 705/02 | (2006.01) |
| B29L 31/00 | (2006.01) |

(52) U.S. Cl.
CPC ............ *B29D 22/003* (2013.01); *B32B 1/08* (2013.01); *B32B 7/12* (2013.01); *B32B 15/08* (2013.01); *B32B 15/082* (2013.01); *B32B 15/20* (2013.01); *B32B 27/06* (2013.01); *B32B 27/08* (2013.01); *B32B 27/30* (2013.01); *B32B 27/306* (2013.01); *B32B 27/308* (2013.01); *B32B 27/32* (2013.01); *B32B 27/325* (2013.01); *B32B 27/34* (2013.01); *B65D 35/10* (2013.01); *B65D 35/14* (2013.01); *B65D 65/40* (2013.01); *B29C 2043/189* (2013.01); *B29K 2023/065* (2013.01); *B29K 2423/0625* (2013.01); *B29K 2455/00* (2013.01); *B29K 2623/0633* (2013.01); *B29K 2705/02* (2013.01); *B29K 2995/0067* (2013.01); *B29L 2031/712* (2013.01); *B32B 2250/05* (2013.01); *B32B 2250/40* (2013.01); *B32B 2270/00* (2013.01); *B32B 2307/30* (2013.01); *B32B 2307/31* (2013.01); *B32B 2307/50* (2013.01); *B32B 2307/72* (2013.01); *B32B 2307/7244* (2013.01); *B32B 2307/7246* (2013.01); *B32B 2307/7248* (2013.01); *B32B 2307/7265* (2013.01); *B32B 2307/732* (2013.01); *B32B 2307/75* (2013.01); *B32B 2435/02* (2013.01); *B32B 2439/00* (2013.01); *B32B 2439/40* (2013.01); *B32B 2439/60* (2013.01); *B32B 2439/70* (2013.01); *B32B 2439/80* (2013.01); *B32B 2553/00* (2013.01); *B32B 2597/00* (2013.01)

(58) Field of Classification Search
CPC ........ B29K 2423/0625; B29K 2455/00; B29K 2623/0633; B29K 2705/02; B29K 2995/0067; B29L 2031/712; B65D 35/10; B65D 35/14; B65D 65/40; B32B 15/082; B32B 15/085; B32B 15/20; B32B 1/08; B32B 2250/05; B32B 2250/40; B32B 2270/00; B32B 2307/50; B32B 2307/72; B32B 2307/7244; B32B 2307/7248; B32B 2307/7265; B32B 2307/732; B32B 2307/75; B32B 2435/02; B32B 2439/40; B32B 2439/70; B32B 2439/80; B32B 2553/00; B32B 2597/00; B32B 27/06; B32B 27/08; B32B 27/30; B32B 27/306; B32B 27/308; B32B 27/32; B32B 27/325; B32B 27/34; B32B 7/12

See application file for complete search history.

(56) References Cited

U.S. PATENT DOCUMENTS

| | | | |
|---|---|---|---|
| 5,372,863 | A | 12/1994 | Nishikawa |
| 5,656,346 | A | 8/1997 | Hirt |
| 7,757,884 | B2 | 7/2010 | Scheifele |
| 2009/0324864 | A1 | 12/2009 | Miller et al. |
| 2015/0336726 | A1* | 11/2015 | Suter ................... B32B 7/12 |
| | | | 206/484.2 |

FOREIGN PATENT DOCUMENTS

| | | |
|---|---|---|
| EP | 0 444 835 B1 | 10/1995 |
| JP | 2611941 B2 | 2/1997 |
| JP | 10-181755 A | 7/1998 |
| JP | 2001-301777 A | 10/2001 |
| JP | 2005-41500 A | 2/2005 |
| WO | 00/58076 A1 | 10/2000 |
| WO | 01/25005 A1 | 4/2001 |
| WO | 2012/164583 A2 | 12/2012 |
| WO | WO-2017078633 A1 * | 5/2017 ......... C08L 23/0815 |

OTHER PUBLICATIONS

Espacenet English abstract of JP 2001-301777 A.
Espacenet English abstract of JP 2005-41500 A.
Espacenet English abstract of JPH07164596 A which corresponds to JP 2611941 B2.
Espacenet English abstract of JP 10-181755 A.

* cited by examiner

ALUMINIUM BARRIER LAMINATE AND BARRIER LINER AT SHOULDER FOR CONTAINER

FIELD OF THE INVENTION

This present invention is in the field of materials science and relates to an aluminium barrier laminate and liner at a shoulder for a container.

BACKGROUND ART

An aluminium tubular container has been used for packaging various dispensing products such as paste-type products. Disadvantages of this tube are that it may be easily deformed and dented and it is expensive. Thereafter, a flexible sheet material have been developed in order to use for forming a tube used for packaging the said paste-type products with properties comparable to an aluminium tube. The flexible sheet materials are generally made of polymeric layers and non-polymeric layers. The non-polymeric layer, such as an aluminium foil, is selected in order to provide a high barrier property of a tubular container.

A laminate tube is a squeezable container used for packaging thickened liquids, such as toothpastes, lotions, gels, creams, etc. The said packaging tube must protect liquid contents. The laminate generally comprises several layers with a barrier layer in order to provide anti-permeation of aroma, vapor, gas, light, etc. through the container.

A tube shoulder is usually manufactured by compression molding of a molten plastic material. The tube shoulder must be separately manufactured, and then it is fused to a tube body. In the present invention, a preformed ABL (aluminium barrier laminate) membrane shoulder is fed on a mandrel, and then it is fused to the tube shoulder. The ABL membrane is cut, such that its diameter is larger than that of the shoulder in order to partially connect to the inner layer of the laminate body.

EP No. 0203265 B1 discloses a multiple layer sheet structure having the layers firmly adhered to each other into a unitary structure, wherein the layers, taken in order include: a layer of linear low density polyethylene (LLDPE) which provides enhanced stress crack resistance on the structure; a first adhesive layer; a metal-foil barrier layer; a second adhesive layer; and a polyethylene layer. The invention provides a multiple layer sheet structure, and tubes made therefrom, having improved stress crack resistance over some prior art structures, and equivalent stress crack resistance to and better resistance to generation of polydust than other structures.

U.S. Pat. No. 4,539,259 discloses a laminate for making a tube. The laminate contains high density polyethylene having excellent strength and other properties needed for making a packaging tube. The laminate comprises a heat-sealable polymeric layer, a first adhesive layer, a layer of metal foil, a second adhesive layer, a layer providing stiffness and deadfold properties, and an outer polymeric layer.

U.S. Pat. No. 4,943,780 discloses a paperless multilayer sheet structure for making a tubular container for packaging dentifrice and other products. The paperless multi-layer sheet structure having two exterior heat-sealable layers comprises, in order: a first heat-sealable layer on one of said exterior surfaces; a first adhesive layer; a layer of metal foil; a second adhesive layer; a layer of polyethylene or ethylene copolymer; a layer of uniaxially oriented polymer; and a second heat-sealable layer on the second of said exterior surfaces. The improved strength and deadfold characteristics of the sheet structure materials are believed to be attributable to the uniaxial orientation of the PP (polypropylene) layer in combination with its proper positioning in the structure. However, use of a thin ABL film as an overlap film in a shoulder for a laminate tube is not disclosed.

EP 0351925 B1 discloses a tube for a flowable material which is susceptible to flavor loss. A tube body is normally constructed from a laminate, such as polyethylene, aluminium foil, paper, and polyethylene. Although the tube operates satisfactorily in dispensing the material, it has been found that the material is subject to flavor loss in a shoulder region. Therefore, the invention further develops the shoulder region constructed of a material such as aluminium. Aluminium foil is resistant to causation of flavor loss in the material. However, there is no detail of how the material used in the shoulder region can prevent the flavor loss.

EP 0444835 B1 discloses a collapsible laminated tube for dentifrice. The laminate structure comprises a layer of a blend of polybutylene terephthalate and polyethylene, an adhesive layer, a metal foil layer, another adhesive layer, a paper layer, and a layer of a blend of polybutylene terephthalate and polyethylene. The blend of polybutylene terephthalate and has a synergistic effect over the use of polybutylene terephthalate or polyethylene alone with regard to a significant decrease in the degree of absorption of flavourants from liquids and pastes.

JP Application No. 2000-118103 discloses a laminated packaging tube, wherein the laminate comprises at least a resin surface layer, an intermediate layer, and a resin inner surface layer. The resin surface layer is formed of several resin layers including a milky white polyethylene-based resin layer. The intermediate layer is formed of a barrier layer made of an aluminium foil or an aluminium-deposited film. The resin inner surface layer is formed of a polyethylene-based resin layer.

JP Publication No. 2005-041500 discloses a laminate film, wherein the laminate comprises, in order: a plastic film/an adhesive/a metal foil/an adhesive/a plastic film. The adhesive is an acid-modified polyolefin resin.

JP 2611941 B2 discloses a squeezable packaging tube characterized in that: a body of the packaging tube is formed in the manner that an innermost layer of a laminated material becomes an inner peripheral layer; the said laminated material comprises: a middle layer composed of a biaxially-drawn synthetic resin film layer having a colored printing layer; an outermost layer is laminated on the outer side of the said middle layer and is composed of a heat-sealable synthetic resin layer; and laminated components comprises a cover layer composed of a colored synthetic resin layer, a barrier layer composed of a metal foil, and an innermost layer comprised of a heat-sealable synthetic resin layer laminated from the middle layer toward the inner side in series. In addition, both of the cover layer and the barrier layer, and the barrier layer and the innermost layer are adhered by an ethylene-methacrylic acid copolymer layer.

WO Publication No. 00/58076 discloses a structure, wherein the structure can be used for forming a tubular body that has a cylindrical shape. A collapsible dispensing container having a body wall formed of the aforementioned structure and having improved product dispense properties is also provided. A coextruded asymmetric multilayer plastic structure whose layers consist of: a barrier layer comprised of an ethylene vinyl alcohol copolymer; an adhesive layer on each surface of said barrier layer; inner and outer surface layers; and a bulk layer positioned between one of said surface layers and an adjacent one of said adhesive layers, said bulk layer being comprised of a thermoplastic polymer and calcium carbonate in an amount sufficient that said multilayer structure has an acceptable level of curling.

For manufacturing a laminated tube with a large diameter, such as 30 mm and more, stiffness or bounce-back property become an important attribute. In general, the laminate having a thickness of 250 microns or more are generally used for manufacturing the tube of such large diameter. Polymers used for forming said laminated tube are usually selected from low density polyethylene (LDPE), linear low density polyethylene (LLDPE), high density polyethylene (HDPE), ethylene vinyl alcohol (EVOH), etc. The HDPE is easily blended with other polyethylenes and known for high environmental stress crack resistance (ESCR). It is important for the invention to provide acceptable deadfold property, bounce-back retention, and chemical-attack prevention.

JP Publication No. 10-181755 discloses an original fabric for a passage-closure member of a laminated packaging tube having a laminated biaxially-extended polyester film or a biaxially-extended polyamide film to both sides by using a metal foil as a base material, and further lamination of an un-extended polyolefin-system-resin film at least on one side of the outside.

U.S. Pat. No. 5,372,863 discloses a laminate-tube container having a shoulder with improved barrier properties. The shoulder comprises a material composed of (A) 0 to 50% by weight of polyethylene, (B) 10 to 50% by weight of an ethylene-vinyl alcohol copolymer or a saponified ethylene-vinyl acetate copolymer, and (c) 10 to 90% by weight of a carboxylic acid-modified adhesive polyethylene resin. The laminate-tube is markedly improved in the gas barrier property at the shoulder thereof and, thus, the quality of the contents of the container can be maintained for a long period of time.

U.S. Pat. No. 5,656,346 discloses a packaging tube comprising a tube body formed from a multilayer plastic laminate having a plastic diffusion barrier layer bonded on both sides to a layer of plastic material selected from the group consisting of polyethylene and polypropylene, the barrier layer and the plastic layers being bonded to each other using bonding agents, a tube head of plastic material connected by abutting and overlapping at least one end of the tube body. the tube head having a shoulder and a discharge portion and further having a diffusion barrier layer, said diffusion barrier layer being formed of a multiple ply plastic laminate comprising a layer of polyethylene or polypropylene and a barrier layer of plastic material, the plastic barrier layer of the tube body and the plastic barrier layer of the tube head each comprising a layer of ethylene-vinyl alcohol polymer or polyethylene terephthalate. the diffusion barrier of the head being arranged upon a side of the shoulder of the tube head facing the inside of the tube body, the means acting as a diffusion barrier extending at least from an end of the tube body as a first end to an entry orifice of said discharge portion as a second end and the plastic material layer of the tube body being attached to the tube head.

US Publication No. 2009/0324864 A1 discloses a method comprising an automated technique for making and inserting a barrier liner of a flexible laminate film into a shoulder/nozzle of a product packaging tube. The laminate film have a polymer layer and a barrier layer comprising ethylene vinyl alcohol copolymers, polyethylene terephthalate polymers, polyethylene naphthalate polymers, and acrylonitrile methylacrylate copolymers. The packaging tube produced using this shoulder/nozzle is very useful for products which contain flavorants, such as dentifrices.

U.S. Pat. No. 7,757,884 discloses a packaging container such as a tube, which is characterized in that a head of the tube is inter alia sealed by an interior annular element configured by a film material that engages with a shoulder of the head. The annular element is produced by pre-forming a plastic film annular element. An example of the internal annular element is not limited to polyethylene and EVAL (a copolymer of ethylene and vinyl alcohol (EVAL™)), or PETP (polyethylene terephthalate polyester), or PA (polyamide).

EP 2714394 A2 discloses a barrier structure comprising: an outer polyethylene layer containing a pigment; a core aluminium layer between two acid copolymer layers; and an inner polyethylene layer; wherein the pigment is with a polyethylene resin in the range of 50% to 75% w/w ratio with the polyethylene carrier resin. The invention provides a laminate tube of a thickness as high as 290 microns that has improved barrier properties. Furthermore, the invention enhances shelf life of the products stored in the laminate tubes by preventing contamination with oxygen.

SUMMARY OF THE INVENTION

This present invention relates to a laminate sheet, particularly an aluminium-based laminate. The present invention also relates to an article made from the laminate tube.

BRIEF DESCRIPTION OF THE DRAWINGS

FIG. 4 shows a schematic view of a shoulder region of a tube in which an internal barrier liner is formed as a hollow cylindrical extension portion with a closure diaphragm, wherein FIG. 4(a) shows a top view, FIG. 4(b) shows a side view, FIG. 4(c) shows a side view without the internal barrier liner, and FIG. 4(d) shows a side view with the internal barrier liner.

DETAILED DESCRIPTION

Figure 1:
FIG. 1 shows a cross-sectional view of a layer structure of a laminate sheet 1 comprising polyethylene film layers 4, co-extruded polyethylene layers 5, co-extruded EAA layers 6, and an aluminium foil layer 7.

Advantages of the subject matter will become apparent with regard to the following description, appended claims, and accompanying drawings.

In this invention, an aluminium barrier laminate structure comprises at least 7 or more layers in total as follows: an outer polyethylene layer; a co-extruded polyethylene layer, a co-extruded EAA (ethylene acrylic acid) layer; a core aluminium layer; a co-extruded EAA layer; a co-extruded polyethylene layer; and an inner polyethylene layer.

In one embodiment, the laminate according to this invention comprises:

a first layer which is a polyethylene-based film having a density of 0.90-0.96 g/cc, wherein: the first layer comprises a polyolefin film layer which may be a monolayer film or a multilayer film, and the outside of the first layer may optionally be printed by a surface printing; furthermore; the first layer may comprise a blend of one or more types of material selected from low density polyethylene, or linear low density polyethylene, or high density polyethylene; and the first layer preferably has a thickness in the range of 50-100 microns;

a second layer which is a polyethylene-based film having a melting temperature of less than 240° C., wherein the second layer is a polyethylene film having a density of 0.85-0.94 g/cc, and the second layer preferably has a thickness in the range of 18-25 microns;

a third layer which is low density polyethylene to provide high adhesion, wherein: a high interlayer adhesive is preferably selected from acid copolymers which is selected from ethylene acrylic acid (EAA) copolymers, ethylene vinyl acetate, ethylene methacrylic acid, maleic anhydride copolymers, or mixture thereof; and the third layer preferably has a thickness in the range of 18-25 microns;

a fourth layer having an aluminium barrier film, wherein the fourth layer has a thickness of 7-20 microns, preferably in the range of 7-12 microns, and more preferably in the range of 8-9 microns;

a fifth layer having low density polyethylene to provide high interlayer adhesion, wherein: a high interlayer adhesive is preferably selected from acid copolymers which is selected from ethylene acrylic acid (EAA) copolymers, ethylene vinyl acetate, ethylene methacrylic acid, maleic anhydride copolymers, or mixture thereof; and the fifth layer preferably has a thickness in the range of 18-25 microns;

a sixth layer having a polyethylene-based film with a melting temperature of less than 240° C., wherein the sixth layer is a polyethylene film having a density of 0.85-0.94 g/cc, and the sixth layer preferably has a thickness in the range of 18-25 microns; and a seventh layer having a polyethylene-based film with a sealing property which is a monolayer film, a multilayer film, preferably a 3-layer film, 5-layer blown film, or a blend of 90% to 99% of polyolefin and 1% to 10% of polyolefin elastomer; and the seventh layer preferably has a thickness in the range of 40-100 microns.

In one embodiment, a process for preparation of the laminate according to this invention comprises: extrusion of high density polyethylene (HDPE) and linear low density polyethylene (LLDPE) by a blown film extrusion process in order to improve physical properties of the film. A 3 to 5-layer blown film can be used by selecting various resin materials having capability of mixing and good properties thereof. Resin material selection can be varied such as HDPE, LDPE, LLDPE, nylon, EVOH, tie, and other materials. In case of the 5-layer blown film, the EVOH layer is selected in order to provide aroma barrier property to the laminate sheet. A co-extrusion procedure can be generally used for forming the co-extruded film. The tie layer is necessary for adhesion of the polyethylene layer and the EVOH layer. The outer layer uses a 3-layer blown film due to features of capability of printing on the outside and the strong middle portion. The inner layer used a 5-layer blown film (polyolefin/tie/EVOH, tie/polyolefin) is used for providing aroma barrier in order to produce the outer layer or the inner layer.

In one embodiment, the laminate according to this invention as mentioned above which a membrane structure is a membrane rondelle film comprises:

the first layer having a thickness in the range of 25-60 microns;

the second layer having a thickness in the range of 5-18 microns;

the third layer having a thickness in the range of 5-18 microns;

the fourth layer having the aluminium barrier film with a thickness of 8 microns;

the fifth layer having a thickness in the range of 5-18 microns;

the sixth layer having a thickness in the range of 5-18 microns; and the seventh layer having a thickness in the range of 25-60 microns.

More specifically, in the first embodiment, a laminate tube according to this invention preferably is formed from a laminate 1 having at least seven layers, wherein the laminate comprises: a central layer 7 which has a barrier property or blocking effect comprising an aluminium foil layer 7; and an EAA layer 6 located on both sides of the central layer 7, a co-extruded polyethylene layer 5, and a polyethylene film layer 4, which the polyethylene (PE) may be LDPE (low density polyethylene), HDPE (high density polyethylene), LLDPE (linear low density polyethylene) or mixtures thereof, as shown in FIG. 1.

Figure 2:
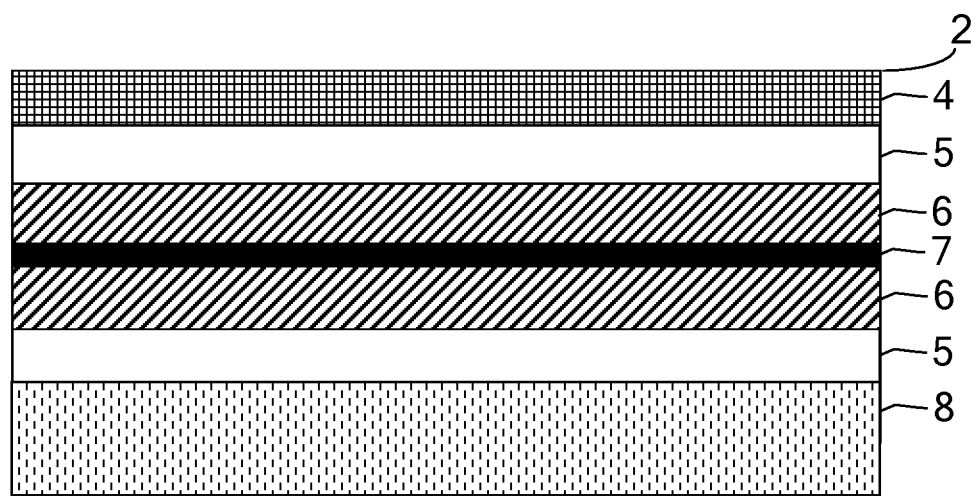
FIG. 2 shows a cross-sectional view of a layer structure of a laminate sheet 2 comprising a polyethylene film layer 4, co-extruded polyethylene layers 5, EAA layers 6, an aluminium foil layer 7, and a 5-multilayer film 8 composed of polyethylene/tie/EVOH/tie/polyethylene having a thickness of 40-100 microns.

More specifically, in one embodiment, a laminate tube according to this invention preferably is formed from a laminate 2 having at least seven layers, wherein the laminate comprises: a central layer 7 which has a barrier property or blocking effect comprising an aluminium foil layer 7; an EAA layers 6 located on both sides of the central layer 7, a co-extruded polyethylene layer 5, and a polyethylene film layer 4, which the polyethylene (PE) may be LDPE (low density polyethylene), HDPE (high density polyethylene), LLDPE (linear low density polyethylene) or mixtures thereof; and a laminate film layer 8 comprising polyethylene/tie/EVOH/tie/polyethylene having a thickness in the range of 40-100 microns, as shown in FIG. 2, in which the polyethylene in the laminate film layer 8 may be LDPE (low density polyethylene), HDPE (high density polyethylene), LLDPE (linear low density polyethylene) or mixtures thereof.

In one embodiment, the outer polyethylene layer and the inner polyethylene layer may independently be a monolayer or multilayer film, preferably a three-layer film.

In one embodiment, a laminate according to this invention comprises:

a first layer having a polyethylene-based film with a density of 0.90-0.95 g/cc, wherein the first layer preferably has a thickness in the range of 50-100 microns;

a second layer with a dry lamination, wherein the second layer preferably has a thickness in the range of 0.5-5 microns;

a third layer with a barrier property, wherein the third layer preferably has an aluminium barrier film having a thickness in the range of 7-20 microns, preferably in the range of 7-12 microns, and more preferably in the range of 8-9 microns;

a fourth layer having low density polyethylene to provide high interlayer adhesion, wherein the fourth layer preferably has a thickness in the range of 18-25 microns;

a fifth layer having a polyethylene-based film with a melting temperature of less than 240° C., wherein the sixth layer preferably has a thickness in the range of 18-25 microns; and a sixth layer having a polyethylene-based film with a sealing property, wherein the sixth layer preferably has a thickness in the range of 40-100 microns.

Figure 3:
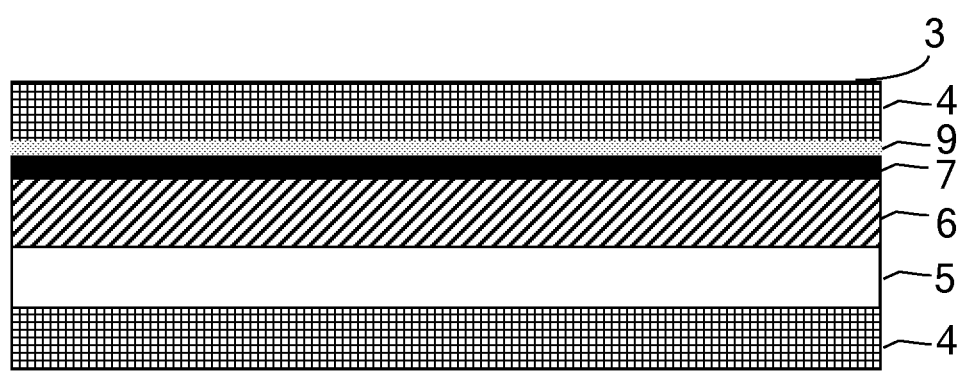
FIG. 3 shows a cross-sectional view of a layer structure of a laminate sheet 3 comprising polyethylene film layers 4, a co-extruded polyethylene layer 5, an EAA layer 6, an aluminium foil layer 7, and a laminate adhesive 9.

In one embodiment, a laminate tube according to this invention preferably is formed from a laminate 3 having at least seven layers, wherein the laminate comprises: a central layer 7 which as a barrier property or blocking effect comprising an aluminium foil layer 7; a EAA layers 6; a co-extruded polyethylene or polyolefin layer 5; polyethylene layers 4, which the polyethylene (PE) may be LDPE (low density polyethylene), HDPE (high density polyethylene), LLDPE (linear low density polyethylene) or mixtures thereof; and a laminate adhesive 9 used herein for adhering the aluminium foil and polyolefin, as shown in FIG. 3.

Dry lamination or extrusion coating has cost-benefit as comparing to extrusion lamination due to a lower coating weight of raw material. Two component adhesive such as polyurethane are usually used in this procedure. The inner film is laminated by means of extrusion on one side of the aluminium foil. The outer film is dry-laminated by using an adhering agent on the other side of said aluminium foil. The extrusion lamination on the inner side of the packaging is selected, due to a high bonding strength obtained from this technique. The bond strength of more than 500 g/15 mm can prevent delamination for the laminated side contacted to liquid bulks.

Figure 4:
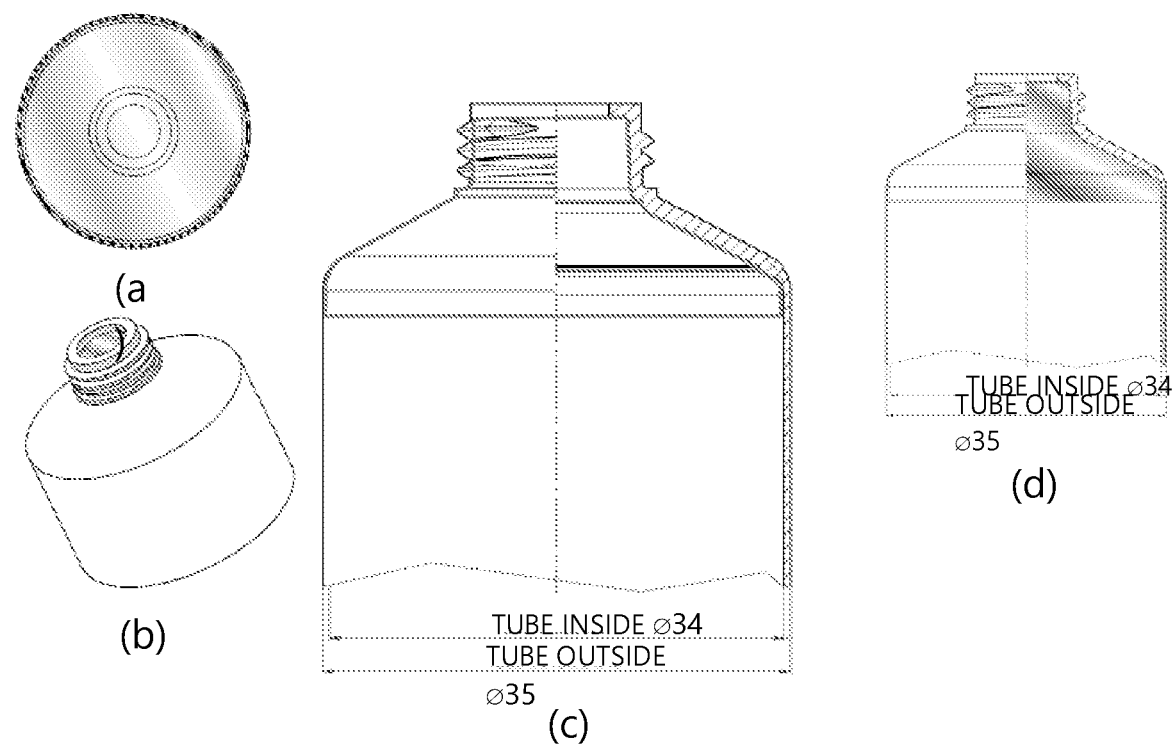

A tube portion which is illustrated a laminate cross-section. Each of the tube portions 1 to 3 together with a head is generally described in FIG. 4, which shows a schematic view of a shoulder region of the tube, in which an internal barrier liner is formed as a hollow cylindrical extension portion with a closure diaphragm.

The laminate tube body comprises: an outer layer of 50% to 30% of high density polyethylene (HDPE) and 50% to 70% of linear low density polyethylene (LLDPE); an aluminium core layer between ethylene acrylic acid (EAA) layers; and an inner layer of 50% to 30% of high density polyethylene (HDPE) and 50% to 70% of linear low density polyethylene (LLDPE). The linear low density polyethylene (LLDPE) has a density of 0.912 g/cc to 0.94 g/cc, and the high density polyethylene (HDPE) has a density of about 0.93 g/cc to 0.97 g/cc.

The low density polyethylene (LDPE) used in the present invention preferably has a density of around 0.918 g/cc to 0.935 g/cc, preferably 0.918 g/cc.

Furthermore, in another embodiment, a laminate comprises: an outer layer of 30% to 50% of high density polyethylene (HDPE) and/or 50% to 70% linear low density polyethylene (LLDPE) having a thickness of 70-100 microns; an ethylene acrylic acid (EAA) layer having a thickness of 15-40 microns; an aluminium core layer having a thickness of 8-12 microns; and an inner layer of 50% to 30% of high density polyethylene (HDPE) and/or 50% to 70% of linear low density polyethylene (LLDPE) having a thickness of 40-70 microns.

In a case of using the aluminium layer having a thickness of less than 9 microns, high voltage of ozone treatment and high pressure at the nip rolls are necessary in order to provide optimum bonding strength (g/15 mm, 180 degrees). Sample 4 is used for packaging liquid or paste having aroma and flavor in order to prevent oxygen and aroma loss. Extrusion coating or dry lamination is applied on one side of the laminate sheet for decreasing cost and a total thickness.

In one embodiment, a laminate at a tube shoulder according to this invention is manufactured by a procedure comprising steps of:

punching the laminate into a shape of the tube shoulder having a diameter of 5-15% larger than that of the tube shoulder;

mounting the punched laminate to a mandrel tip where the tube body is already preloaded in order to obtain the mandrel mounted with the tube body;

moving the mandrel mounted with the tube body and the laminate to a next station where a doughnut-shaped HDPE is dosed inside a shoulder mold;

closing and compressing the shoulder mold and the mandrel mounted with the tube body and the laminate in order to form a desired shape of the shoulder;

fixing the laminate permanently to an inner dome surface of the compression-molded tube shoulder; and fusing the laminate with the melted doughnut-shaped HDPE, thereafter forming permanent bond together with the composite laminate in order to obtain the tube shoulder.

In one embodiment of this invention, a laminate tube having the laminate as mentioned above is also provided, wherein the tube shoulder is manufactured from a melt-blended resin comprising 50-90% of HDPE, 5-15% of LLDPE, and 5-35% of a cyclic olefin copolymer.

Samples

TABLE 1

Laminate Structures

| Samples | Total | Detail/Thickness (microns) | | | | | | |
|---|---|---|---|---|---|---|---|---|
| | | 1$^{st}$ Layer | 2$^{nd}$ Layer | 3$^{rd}$ Layer | 4$^{th}$ Layer | 5$^{th}$ Layer | 6$^{th}$ Layer | 7$^{th}$ Layer |
| Sample 1 | 200 | Polyolefin/ 70 | LLDPE/ 14 | EAA/ 14 | Al Foil/12 | EAA/ 20 | LLDPE/ 20 | Polyolefin/ 50 |
| Sample 2 | 250 | Polyolefin/ 100 | LLDPE/ 18 | EAA/ 18 | Al Foil/12 | EAA/ 34 | LLDPE/ 18 | Polyolefin/ 50 |
| Sample 3 | 199 | Polyolefin/ 70 | LLDPE/ 15 | EAA/ 15 | Al Foil/9 | EAA/ 20 | LLDPE/ 20 | Polyolefin/ 50 |
| Sample 4 | 250 | Polyolefin/ 100 | LLDPE/ 18 | EAA/ 18 | Al Foil/12 | EAA/ 34 | LLDPE/ 18 | 5-Layer Blown Film/50 |
| Sample 5 | 200 | Polyolefin/ 85 | Dry Laminate/3 | Al Foil/12 | EAA/ 25 | LLDPE/ 25 | Polyolefin/ 50 | — |

TABLE 2

OTR and WVTR of Laminates

| Samples | OTR* at 23° C., 0% RH cc/m² · day | WVTR* at 38° C., 90% RH g/m² · day |
|---|---|---|
| Sample 1 | 0.031 | 0.043 |
| Sample 2 | 0.030 | 0.040 |
| Sample 3 | 0.031 | 0.024 |
| Sample 4 | 0.031 | 0.030 |
| Sample 5 | 0.033 | 0.038 |

*OTR tests are subjected to ASTM D3985, whereas WVTR tests are subjected to ASTM F1249.

Samples 1-2 are conventional laminate structures, and samples 3-5 are laminate structures of this invention, as shown in Table 1.

OTR (oxygen transmission rate) and WVTR (water vapor transmission rate) are important values in shelf life evaluation of products in a packaging. The controlled OTR is generally desired in order to obtain quality, safety, and shelf life of the packaging. The WVTR is important for humidity-susceptive food and medicine in a packaging.

The oxygen gas transmission rate (OTR) and water vapor transmission rate (WVTR) of all laminate sheets are clearly shown in Table 2. Sample 1 has the same 0 value as sample 3 even though the thickness of the aluminium foil is decreased from 12 microns to 9 microns. Sample 2 has the better OTR value than that of sample 4 by about 3%. In this case, the five-layer blown film with EVOH may prevent aroma loss from the packaging tube. Sample 5 with the dry lamination technique shows the OTR value of 0.033. Samples 3-5 have OTR values almost comparable to those of the samples 1 and 2.

The WVTR test results of samples 3-5 are improved to provide a better barrier packaging. The WVTR of Sample 3 is better than that of sample 1 by 44%. Moreover, the WVTR of Sample 4 is better than that of sample 2 by 25%. In addition, the WVTR of Sample 5 is better than that of sample 1 by 12%. It is seem that the samples 3-5 can be used for packaging solid and liquid products.

The laminate having a thickness of approximate 150-300 microns is usually used for making the tube. The laminate with the lower thickness for making the tube may not pass burst test and drop test.

Stress Crack Test

Stress crack resistance experiments were performed with aggressive hair color cream at the tube shoulder. In general, a laminate tube with an internal barrier liner in the form of the plate-shaped disc could not tolerate that stress crack test. Tube samples 3-5 with the plate-shaped disc were filled with the hair color cream at 50° C. A duplicate set of the samples with a hollow cylindrical extension portion with a closure diaphragm were filled and stored at 50° C. Stress crack failures were appeared in the tubes with the plate-shaped disc after 3 days, while the tube samples with the hollow-cylindrical extension portion with the closure diaphragm show no failure after 1 month.

Therefore, it is clearly seen that this invention provides the laminate tube having improved stress crack resistance and oxygen permeation resistance better than other conventional packaging tubes.

As various specific examples have been described above, these specific examples should not be regarded as limitations to the scope of any embodiments, but they are only illustrations of the preferred embodiments. It is possible that other various variations are also regarded as falling within the spirit according to various embodiments.

The invention claimed is:

1. A laminate comprising:
    a first layer having a polyethylene-based film with a density of 0.90-0.96 g/cc;
    a second layer having a linear low density polyethylene-based film with a melting temperature of less than 240° C.;
    a third layer having low density polyethylene in order to provide high adhesion;
    a fourth layer adjacent to the third layer having an aluminum barrier film with a thickness of 7-20 microns;
    a fifth layer adjacent to the fourth layer having low density polyethylene that provides in order to provide high interlayer adhesion;
    a sixth layer having a linear low density polyethylene-based film with a melting temperature of less than 240° C.; and
    a seventh layer having a polyethylene-based film with a sealing property,
    wherein the seventh layer is a 5-layer blown film comprising a resin with barrier properties, wherein the resin with barrier properties comprises EVOH, wherein the seventh layer is the innermost layer in the laminate.

2. The laminate of claim 1, wherein the first layer comprises a polyolefin film layer which is a monolayer film or a multilayer film.

3. The laminate of claim 1, wherein the first layer comprises a blend of one or more types of material selected from the group consisting of low density polyethylene, or linear low density polyethylene, and high density polyethylene.

4. The laminate of claim 1, wherein an outside of the first layer is by a surface printing.

5. The laminate of claim 1, wherein the low density polyethylene of the third layer and the fifth layer is a high interlayer adhesive copolymer selected from the group consisting of ethylene acrylic acid (EAA) copolymers, ethylene vinyl acetate, ethylene methacrylic acid, maleic anhydride copolymers, and mixture thereof.

6. The laminate of claim 1, wherein the fourth layer has a thickness in the range of 7-12 microns.

7. The laminate of claim 1, wherein the laminate has a structure comprising:
    the first layer having a thickness in the range of 50-100 microns;
    the second layer having a thickness in the range of 18-25 microns;
    the third layer having a thickness in the range of 18-25 microns;
    the fourth layer having an aluminum barrier film with a thickness of 8 microns;
    the fifth layer having a thickness in the range of 18-25 microns;
    the sixth layer having a thickness in the range of 18-25 microns; and
    the seventh layer having a thickness in the range of 40-100 microns.

8. The laminate of claim 1, wherein the laminate is a membrane rondelle film wherein:
    the first layer having a thickness in the range of 25-60 microns;
    the second layer having a thickness in the range of 5-18 microns;
    the third layer having a thickness in the range of 5-18 microns;

the aluminum barrier film of the fourth layer has a thickness of 8 microns;

the fifth layer having a thickness in the range of 5-18 microns;

the sixth layer having a thickness in the range of 5-18 microns; and the seventh layer having a thickness in the range of 25-60 microns.

9. The laminate of claim 1, wherein the first layer consists of polyolefin.

10. The laminate of claim 1, wherein the laminate has an oxygen transmission rate as measured according to ASTM D3985 that is 0.031 or less and a water vapor transmission rate as measured according to ASTM F1249 that is 0.038 or less.

11. A laminate tube comprising the laminate of claim 1 and a shoulder region in which an internal barrier liner is formed as a hollow cylindrical extension portion with a closure diaphragm, wherein the shoulder region is manufactured by a procedure comprising steps of:

punching the laminate into a shape of a tube shoulder having a diameter of 5-15% larger than that of the tube shoulder;

mounting the punched laminate to a mandrel tip where the tube body is already preloaded in order to obtain the mandrel mounted with the tube body;

moving the mandrel mounted with the tube body and the laminate to a next station where a doughnut-shaped HDPE is dosed inside a shoulder mold;

closing and compressing the shoulder mold and the mandrel mounted with the tube body and the laminate in order to form a desired shape of the shoulder;

fixing the laminate permanently to an inner dome surface of the compression-molded tube shoulder; and fusing the laminate with the melted doughnut-shaped HDPE, thereafter forming permanent bond together with the composite laminate in order to obtain the tube shoulder.

12. The laminate of claim 11, wherein the laminate has an oxygen transmission rate as measured according to ASTM D3985 that is 0.031 or less and a water vapor transmission rate as measured according to ASTM F1249 that is 0.038 or less.

13. A laminate tube having the laminate as claimed in claim 1, wherein the tube is manufactured by a procedure comprising steps of:

punching the laminate into a shape of the tube shoulder having a diameter of 5-15% larger than that of the tube shoulder;

mounting the punched laminate to a mandrel tip where the tube body is already preloaded in order to obtain the mandrel mounted with the tube body;

moving the mandrel mounted with the tube body and the laminate to a next station where a doughnut-shaped HDPE is dosed inside a shoulder mold;

closing and compressing the shoulder mold and the mandrel mounted with the tube body and the laminate in order to form a desired shape of the shoulder;

fixing the laminate permanently to an inner dome surface of the compression-molded tube shoulder; and fusing the laminate with the melted doughnut-shaped HDPE, thereafter forming permanent bond together with the composite laminate in order to obtain the tube shoulder.

\* \* \* \* \*